Feb. 27, 1951 C. N. BACE 2,543,146

TELEVISION CABINET WITH SLIDING REMOVABLE CHASSIS

Filed May 17, 1948 3 Sheets-Sheet 1

INVENTOR.
Charles N. Bace,

BY Victor J. Evans & Co.

ATTORNEYS

Feb. 27, 1951 C. N. BACE 2,543,146

TELEVISION CABINET WITH SLIDING REMOVABLE CHASSIS

Filed May 17, 1948 3 Sheets-Sheet 2

INVENTOR.

Charles N. Bace,

BY Victor J. Evans & Co.

ATTORNEYS

TELEVISION CABINET WITH SLIDING REMOVABLE CHASSIS

Filed May 17, 1948 3 Sheets-Sheet 3

INVENTOR.
Charles N. Bace,
BY Victor J. Evans & Co.
ATTORNEYS

Patented Feb. 27, 1951 | 2,543,146

UNITED STATES PATENT OFFICE 2,543,146

TELEVISION CABINET WITH SLIDING REMOVABLE CHASSIS

Charles N. Bace, River Edge, N. J.

Application May 17, 1948, Serial No. 27,438

1 Claim. (Cl. 178—7.5)

My present invention relates to an improved television cabinet with sliding removable chassis of the type especially adapted for use in offering television exhibitions to large groups in public or private places and consisting of the conventional television circuit and parts and with remote control apparatus, located within a cabinet so constructed that access may be had to the interior only by authorized persons, and those persons, due to the unique arrangement of the chassis will have free access to all parts of the chassis without removing the same from the cabinet.

Customarily in the conventional television sets the parts are inaccessible without removing the entire apparatus including the cathode ray tube, all of which is time-consuming and expensive. Using the construction of my invention any part may be removed or replaced without disturbing the balance of the elements of the set.

In the accompanying drawings I have illustrated one complete example of the physical embodiment of my invention according to the best mode I have thus far devised but it will be understood that various changes and alterations may be made in the exemplified structure within the scope of the appended claim.

Figure 1:
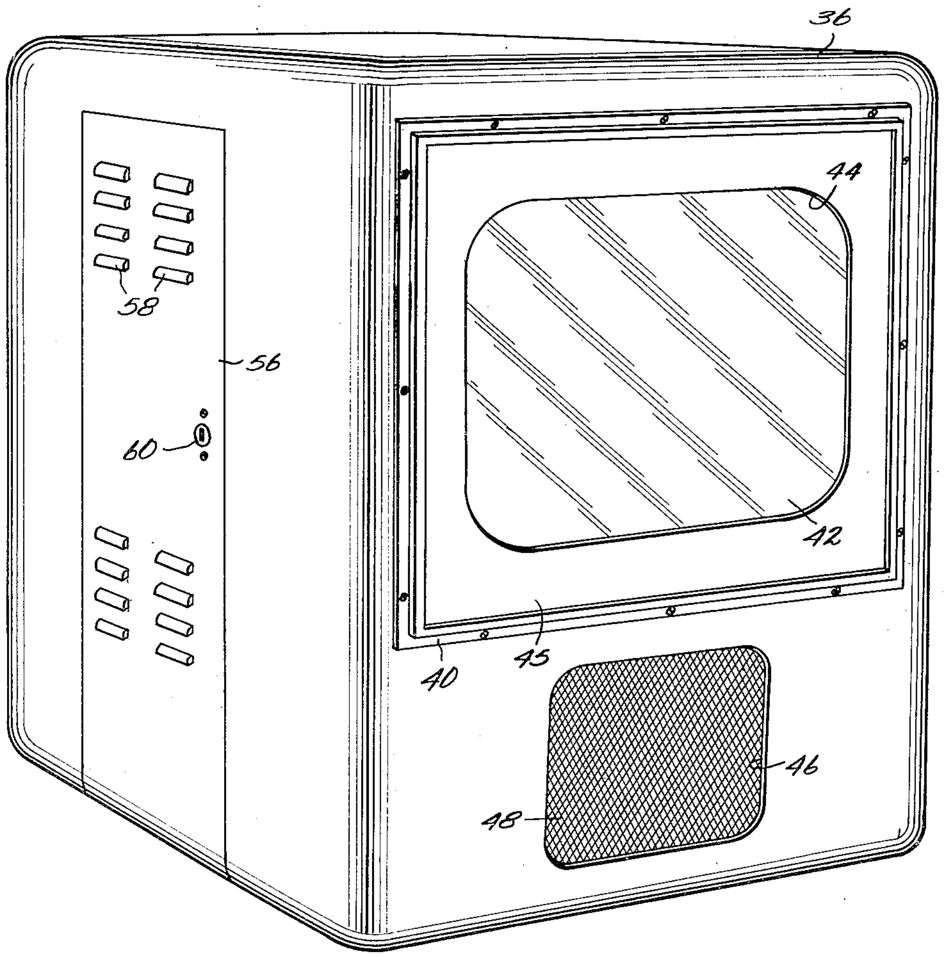
Figure 1 is a front view in perspective showing the cabinet of my invention.
Figure 7:
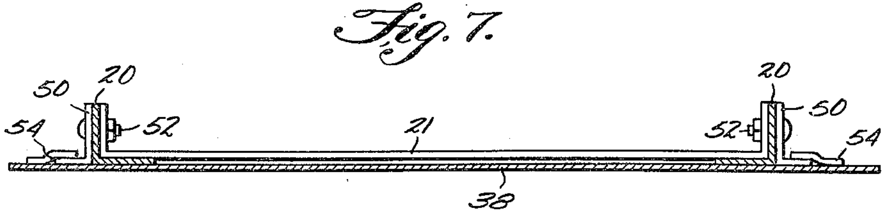
Figure 7 is a detail sectional view of the chassis assembly.

Referring now to the drawings wherein I have illustrated the present preferred form of my invention I utilize a base or main chassis 2 for supporting the conventional electrical components or elements of the modern television set including the vacuum tubes 4, transformers 6, chokes 8 and condenser 10. A focus coil 12 has a cover 13 and the deflector yoke 14 has a cover 15, the covers being secured by wing nuts 16 to receive and permit adjustment of the neck 17 of the conventional cathode ray tube 18.

The television chassis above referred to is mounted vertically upon the supporting chassis which comprises the side bars 20 of angle iron or other suitable material connected laterally by a transverse brace bar 21, and the vertical arms 22 forward of the side bars are connected by a curved rest 24 upon which is carried the pad 25 for the tube 18, the arms 22 and the rest 24 defining a vertically disposed frame.

A rear bracket 26 is provided for the coil 12 and the yoke 14, and for support of the neck of the tube, the bracket 26 being carried by the upper end or wall of the chassis 2.

Extending forwardly of the vertical arms 22 I provide pairs of arms or fingers 28 and 30 which support the speaker board 32 and the speaker 34.

To house the above assembly I provide a sheet metal cabinet 36 having a bottom wall 38, and on the front wall thereof I provide a frame 40 for the glass 42 covering the opening 44. The mask 45 interior of the front wall and about the opening bears against the front face of the cathode tube to define the area in which the picture is visible.

Below the screen on the front wall of the cabinet I provide an opening 46 covered as by cloth 48 behind which is positioned the speaker 34.

Figures 2, 5, 8, 9:
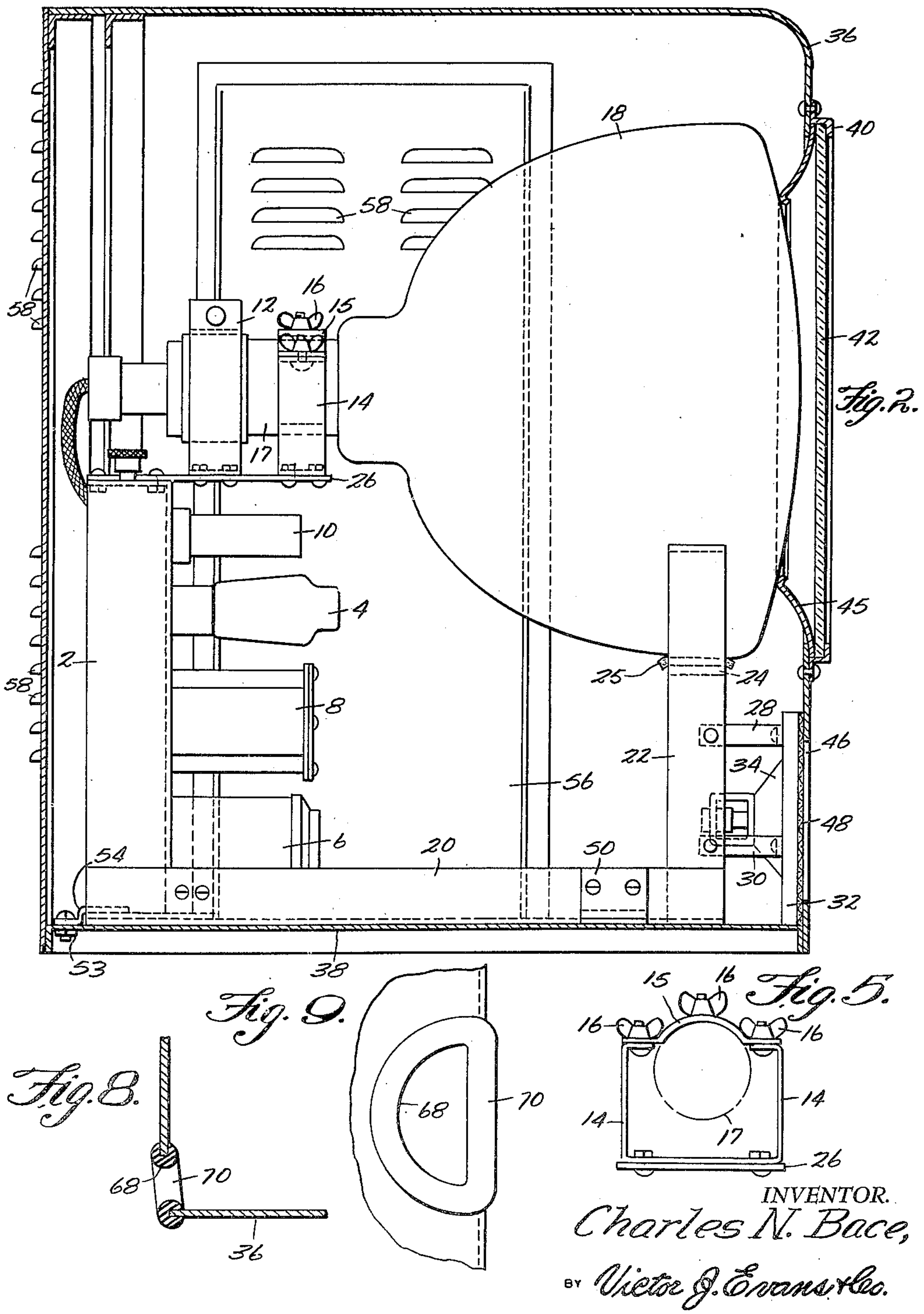
Figure 2 is a longitudinal vertical sectional view thereof.
Figure 5 is an elevational view of one of the rear supports for the neck of the tube.
Figure 8 is a sectional view through one corner of the cabinet showing the opening for the cables.
Figure 9 is a partial elevational view of the cabinet showing the cable opening.
Figure 3:
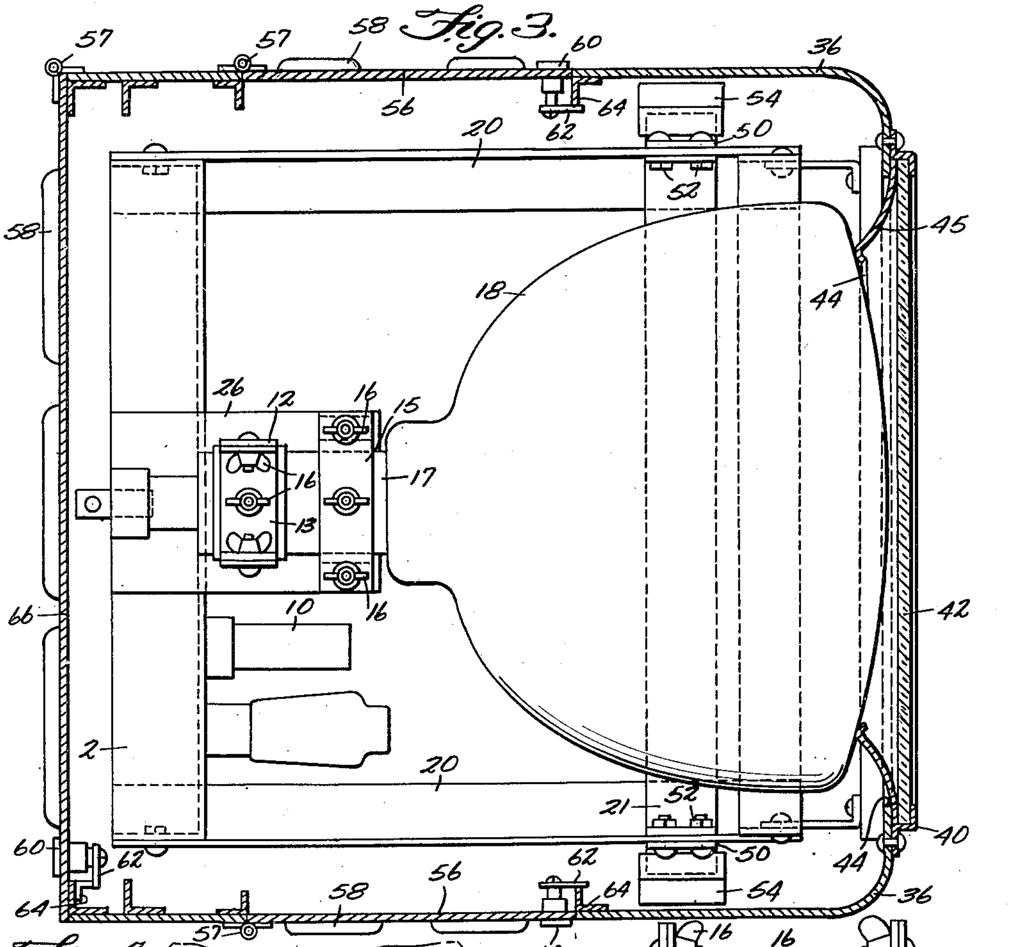
Figure 3 is a horizontal sectional view.
Figure 4:
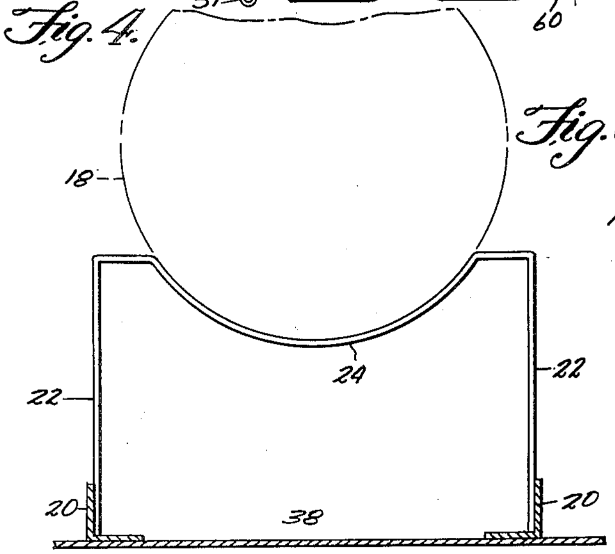
Figure 4 is a front elevational view of the cathode tube and its front support.
Figure 6:
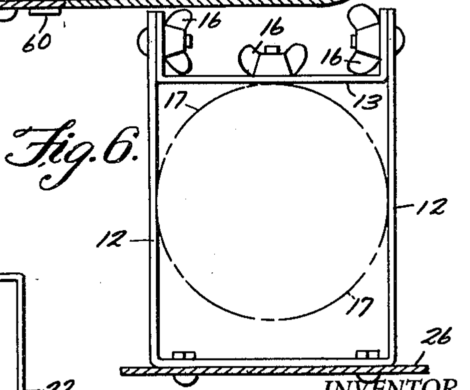
Figure 6 is a similar view of the second rear support.

To secure the supporting chassis detachably but rigidly to the cabinet I employ suitable numbers of angle members 50 secured to the side bars 20 by bolts 52, and when used vertically as in Figure 2, the nuts 53 are preferably welded to the bottom wall of the cabinet. I also employ offset clamps 54 under which the angle members 50 may be slid and it will be apparent that with the clamps 54 secured as by welding to the cabinet bottom wall, the chassis will be firmly held in position.

To permit access to the interior of the cabinet for inspection, adjustment or replacement of parts, I provide side doors 56 hinged at 57 and formed with louvres 58, and these doors have suitable lock 60 and interior swinging bolts 62 engageable with the keepers 64. The rear door 66 is mounted and may be locked similarly to the side doors, and in one corner of the cabinet, preferably a rear corner, I form an opening 68 which may be fitted with a rubber gommet 70 so that the audio and video control cables 72 and 74 and the current cable 76 may pass through the cabinet wall without interfering with the opening of the doors.

From the above description it will be clear that with the main chassis supported vertically on the supporting chassis which also carries the cathode tube, the entire assembly is housed as a unit in the cabinet by means of the doors fitted with locks. Only authorized persons may have access to the set and by means of the same doors such persons may readily test, repair, or replace any parts without the necessity of removing the operating parts.

Due to the firm assembly of the cabinet and chassis the set may be shipped without fear of damage, and with the remote control arrangement contemplated, the cabinet may be set up for use in public rooms without the viewers and unauthorized persons having access either to the controls or to the set itself.

Having thus fully described my invention what I claim as new and desire to secure by Letters Patent is:

In a television receiving set, a cabinet, a pair of spaced parallel horizontally disposed angle side bars, a transverse brace extending between said side bars and secured thereto, a vertically disposed main chassis secured to said side bars for supporting electrical components, a horizontally disposed rear bracket secured to the upper end of said main chassis, a yoke projecting upwardly from said bracket for supporting the neck of a cathode ray tube, a cover detachably connected to said yoke for maintaining said cathode ray tube immobile, a frame comprising two vertically disposed arms secured to said side bars, a curved rest interconnecting said arms and coacting with said rear bracket to support the cathode ray tube, a pad supported on said curved rest, a plurality of fingers projecting forwardly from said vertically disposed arms, a vertically disposed speaker board secured to the fronts of said fingers, said cabinet including a horizontally disposed bottom panel, a plurality of offset angle members secured to said side bars for slidably engaging a plurality of offset clamps secured to said bottom panels, said side bars including a vertically disposed portion and a horizontally disposed portion, said angle members being L-shaped and having a vertically disposed portion secured to the vertically disposed portions of said side bars.

CHARLES N. BACE.

REFERENCES CITED

The following references are of record in the file of this patent:

UNITED STATES PATENTS

| Number | Name | Date |
|---|---|---|
| D. 123,588 | Drake | Nov. 19, 1940 |
| 1,521,650 | Rudolph | Jan. 6, 1925 |
| 2,207,510 | Flaherty et al. | July 9, 1940 |
| 2,411,528 | Dodington | Nov. 26, 1946 |

FOREIGN PATENTS

| Number | Country | Date |
|---|---|---|
| 512,716 | Great Britain | Sept. 25, 1939 |
| 528,198 | Great Britain | Oct. 24, 1940 |